United States Patent
Zhang et al.

(10) Patent No.: US 12,174,330 B2
(45) Date of Patent: Dec. 24, 2024

(54) DOWNHOLE ELECTROMAGNETIC LOGGING INSTRUMENT

(71) Applicants: CHINA PETROLEUM & CHEMICAL CORPORATION, Beijing (CN); PETROLEUM ENGINEERING INSTITUTE OF ZYOF BRANCH, SINOPEC, Puyang (CN)

(72) Inventors: Qingsheng Zhang, Puyang (CN); Fei Xu, Puyang (CN); Hua Huang, Puyang (CN); Cheng Zhang, Puyang (CN); Wenchang Zhang, Puyang (CN); Qing Luo, Puyang (CN); Xiaolei Li, Puyang (CN); Lingling Zhu, Puyang (CN)

(73) Assignees: CHINA PETROLEUM & CHEMICAL CORPORATION, Beijing (CN); PETROLEUM ENGINEERING INSTITUTE OF ZYOF BRANCH, SINOPEC, Puyang (CN)

( * ) Notice: Subject to any disclaimer, the term of this patent is extended or adjusted under 35 U.S.C. 154(b) by 168 days.

(21) Appl. No.: 17/918,605

(22) PCT Filed: Apr. 20, 2021

(86) PCT No.: PCT/CN2021/088268
§ 371 (c)(1),
(2) Date: Oct. 13, 2022

(87) PCT Pub. No.: WO2021/213352
PCT Pub. Date: Oct. 28, 2021

(65) Prior Publication Data
US 2023/0142576 A1 May 11, 2023

(30) Foreign Application Priority Data
Apr. 22, 2020 (CN) .......................... 202010322764.8

(51) Int. Cl.
*G01V 11/00* (2006.01)
*E21B 47/07* (2012.01)
*E21B 47/13* (2012.01)

(52) U.S. Cl.
CPC ............ *G01V 11/002* (2013.01); *E21B 47/07* (2020.05); *E21B 47/13* (2020.05)

(58) Field of Classification Search
CPC ....... G01V 11/002; E21B 47/07; E21B 47/13; E21B 47/092; E21B 47/085; E21B 47/113; E21B 47/26; E21B 47/00; E21B 47/04
See application file for complete search history.

(56) References Cited

U.S. PATENT DOCUMENTS

| | | | | |
|---|---|---|---|---|
| 5,130,706 A | * | 7/1992 | Van Steenwyk | E21B 47/13 340/854.6 |
| 7,145,834 B1 | * | 12/2006 | Jeter | G01V 11/002 251/129.05 |

(Continued)

FOREIGN PATENT DOCUMENTS

| CN | 101956549 A | 1/2011 |
|---|---|---|
| CN | 110965983 A | 4/2020 |

OTHER PUBLICATIONS

International Search Report (PCT/ISA/210) with English translation, and Written Opinion (PCT/ISA/237) mailed on Jul. 9, 2021, by the China National Intellectual Property Administration (ISA/CN) as the International Searching Authority for International Application No. PCT/CN2021/088268. (9 pages).

(Continued)

*Primary Examiner* — Akm Zakaria
(74) *Attorney, Agent, or Firm* — Panitch Schwarze Belisario & Nadel LLP (57) ABSTRACT

A downhole electromagnetic logging tool comprises a transmitting system, a magnetic field sensor array and a control (Continued)

module. The transmitting system and the magnetic field sensor array are both connected to the control module. The transmitting system comprises an upper emission coil and a lower emission coil, which are respectively arranged above and below the magnetic field sensor array, for generating magnetic fields of opposite polarities, allowing the magnetic fields to be concentrated at the magnetic field sensor array. A casing generates a secondary magnetic field, which is received by the magnetic field sensor array to complete detection of the casing.

9 Claims, 7 Drawing Sheets

(56) References Cited

U.S. PATENT DOCUMENTS

| | | | |
|---|---|---|---|
| 9,598,954 B1 | 3/2017 | Zhang et al. | |
| 11,493,661 B2 * | 11/2022 | Dementyev | E21B 49/00 |
| 2013/0113468 A1 * | 5/2013 | Gao | E21B 49/08 |
| | | | 73/152.28 |
| 2016/0187523 A1 * | 6/2016 | Sanmartin | G01N 27/82 |
| | | | 324/339 |
| 2017/0329035 A1 * | 11/2017 | Wu | G01V 3/26 |
| 2020/0088904 A1 | 3/2020 | Dementyev et al. | |
| 2023/0142576 A1 * | 5/2023 | Zhang | E21B 47/092 |
| | | | 324/346 |

OTHER PUBLICATIONS

Search Report issued on Jul. 15, 2024, by the Russian Patent Office in corresponding Russian Patent Application No. RU2022125731.

* cited by examiner

DOWNHOLE ELECTROMAGNETIC LOGGING INSTRUMENT

CROSS REFERENCE OF RELATED APPLICATION

The present application claims the priority of Chinese patent application No. 202010322764.8, entitled "Downhole electromagnetic logging tool" and filed on Apr. 22, 2020, the entire content of which is incorporated herein by reference.

FIELD OF THE INVENTION

The present invention relates to a downhole electromagnetic logging tool, which belongs to the field of logging equipment in oil and gas field engineering.

BACKGROUND OF THE INVENTION

At present, as the productive life of oil and gas field production wells extends, more and more wells suffer casing deformation. Thus it is necessary to timely know the state of downhole casing deformation, in order to provide guidelines on the following operations. Traditional casing detection technologies, such as ultrasonic downhole TV logging, eagle eye TV logging and dobby caliper logging, are all logging methods of tubing wall imaging. When a deformed casing is measured, the measurement can be only performed when the detecting tool directly touches an inner wall of the casing after the tubing is taken out. In particular, in high-sulfur gas fields, the downhole pipe string adopts a permanent packer. Before the tubing is taken out, it is necessary to implement a series of operations, such as well killing, oil layer temporary plugging, packer milling or the like. These operations are complicated, time-consuming, expensive and high-risk, so that such direct-contact casing logging methods have limited applications. Therefore, it is necessary to conduct a three-dimensional accurate evaluation on the casing deformation through the tubing.

For this reason, an engineering electromagnetic logging device that performs logging based on electromagnetic information has been proposed. Since the engineering electromagnetic logging device is a non-destructive, contactless device, which is not easily affected by downhole fluid, scaling and wax deposition, it becomes one of the most widely used casing detection technologies.

In general, the engineering electromagnetic logging device consists of a longitudinal long probe, a longitudinal short probe and a transverse probe. The longitudinal long probe and the longitudinal short probe are placed parallel to an axis of the device. The transverse probe is composed of two mutually perpendicular coils, which are arranged vertical to the axis of the device. All probes operate in a self-transmitting and self-receiving mode, so that each probe acts as a transmitter and a receiver. During measurement, the probes are driven by a set of pulse currents for a short time to generate an alternating magnetic field, which affects the casing to generate an induced eddy current electric field in the casing. During the shutdown of magnetic field of the transmitting source, a secondary magnetic field generated by the eddy current electromagnetic signal will generate an induced electromotive force in the probes. By detecting the magnitude and change of the induced electromotive force, parameters of the casing can be evaluated, including wall thickness of the casing, cracks in the casing wall, dislocation of the casing, type and degree of the casing deformation, or the like. However, the induced electromotive force received by the probes is a secondary magnetic field containing an excitation magnetic field and the eddy current electric field of the casing. Therefore, for a multiple-layer pipe string, in order to achieve a larger detection distance and higher detection accuracy, the driving current for the probes should be increased accordingly, so as to enhance the strength of the excitation magnetic field. However, in view of the limitation on the inner diameter of the tubing, this will significantly increase the cost of components and the difficulty of manufacturing the device.

Therefore, it is proposed to use a magnetic field sensor array to receive magnetic field information, in order to improve the detection accuracy. For example, CN110965983A discloses a downhole electromagnetic flaw detector, which is an electromagnetic logging tool that adopts separate transmission and reception of signals, and array reception as well. The downhole electromagnetic flaw detector includes a processor module, a transmitting coil, and a magnetic field sensor array, realizing multiple simultaneous reception for one transmission, which shortens the period of one single acquisition. Accordingly, the deviation between the recording-start angle and the recording-end angle of each sensor is reduced, thus improving the accuracy of measurement. Based on the principle of electromagnetic induction, this detector adopts rectangular short-period (generally 300-500 ms) pulse current unipolar emission to control the switching current of the transmitting coil to generate a magnetic field. Since the tubing is generally made of high sulfur-resistant Ni-based alloy materials of low magnetic permeability, most of the magnetic field generated by the switching current of the transmitting coil can be directly transmitted to the casing after penetrating through the tubing, so that the tubing and the casing will each generate a secondary electromagnetic field simultaneously, which will be received by the magnetic field sensor array. Such two types of signals are overlapped with each other, and then information on the casing can be obtained by analyzing the signals. However, the magnetic field lines of the unipolar transmitting system are relatively scattered, so that it is impossible to focus most of the magnetic field on the casing after penetrating through the tubing. Therefore, the difficulty of signal analysis is increased, and the accuracy of interpreting the casing condition is reduced accordingly.

SUMMARY OF THE INVENTION

The present invention aims to propose a downhole electromagnetic logging tool, by which the problem concerning inaccurate measurement of traditional logging tools can be addressed.

For this purpose, the present invention proposes a downhole electromagnetic logging tool, which comprises a transmitting system for generating a magnetic field, a magnetic field sensor array for receiving a secondary magnetic field, and a control module connected with the transmitting system and the magnetic field sensor array. The transmitting system includes an upper transmitting coil and a lower transmitting coil arranged above and below the magnetic field sensor array, respectively, for generating magnetic fields with opposite polarities and opposite directions, so that the magnetic fields with different directions are concentrated, according to the principle of same-polarity repulsion, at a position where the magnetic field sensor array is located. The magnetic field sensor array receives the secondary magnetic field for completion of detection on a casing.

The technical solution of the downhole electromagnetic logging tool according to the present invention can generate technical effect as follows. The transmitting system of the present invention includes two transmitting coils, i.e., an upper transmitting coil and a lower transmitting coil arranged above and below the magnetic field sensor array, respectively. When the magnetic fields generated by the upper and lower transmitting coils are in opposite directions, the polarity of one end of the upper transmitting coil close to the magnetic field sensor array is the same as that of one end of the lower transmitting coil close to the magnetic field sensor array. According to the principle of same-polarity repulsion, the magnetic fields are more concentrated at the detection point, and will be concentrated on the casing with larger radii after passing through the tubing, so that the magnetic field formed on the casing can be concentrated, which indicates that the strength of the magnetic field as a whole is enhanced. Therefore, when the upper transmitting coil and the lower transmitting coil are turned off, the casing will generate a larger secondary magnetic field, which carries more information on the casing to be received by the magnetic field sensor array. Since more information on the casing is carried, the shape of the casing can be featured more accurately, so that the detection of the casing can be more accurate.

Further, in order that the upper transmitting coil and the lower transmitting coil can generate magnetic fields with opposite polarities in a convenient and reliable manner, the upper transmitting coil and the lower transmitting coil are wound in a same way, so that magnetic fields with opposite polarities can be generated by currents of a same magnitude but opposite directions flowing in the coils.

Further, in order to generate concentrated magnetic fields by the upper transmitting coil and the lower transmitting coil and also enhance the strength of the magnetic fields generated by the upper transmitting coil and the lower transmitting coil, the upper transmitting coil and the lower transmitting coil each comprise a magnetic cylinder wound by a low-resistance insulating cable of multi-turn closed-loop coils.

Further, in order to control turn-on and turn-off of the upper transmitting coil and the lower transmitting coil in a convenient, flexible and reliable manner and improve efficiency of the detection, the downhole electromagnetic logging tool may further comprise a power drive module, wherein the control module is connected with the upper transmitting coil and the lower transmitting coil via the power driving module.

Further, in order to expand the coverage of the magnetic field sensor array, improve the angular resolution thereof, increase the detection accuracy on the casing and reduce the blind area for detection, the magnetic field sensor array may be a rotatable magnetic field sensor array, and the downhole electromagnetic logging tool further comprises a driving device for driving the magnetic field sensor array in rotation, the driving device being connected to the control module.

Further, in order to improve accuracy of controlling the rotation of the rotatable magnetic field sensor array, the driving device may be a rotary stepping motor, through which the control module controls rotation of the rotatable magnetic field sensor array.

Further, the magnetic field sensor array may comprise a magnetic field sensor array shell, at least two magnetic field sensors, a mounting bracket for fixing the sensors, and a non-magnetic skeleton for fixing the mounting bracket.

Further, the magnetic field sensor array may comprise a magnetic field sensor array shell, at least two magnetic field sensors, a mounting bracket for fixing the sensors, and a non-magnetic skeleton for fixing the mounting bracket, the non-magnetic skeleton being installed on a rotating shaft of the driving device.

Further, in order to assist in operation of the downhole electromagnetic logging tool, the downhole electromagnetic logging tool may further comprise a natural gamma probe, a motion trajectory recording module and a temperature sensor, wherein the natural gamma probe, the motion trajectory recording module and the temperature sensor are all connected to the control module, and the transmitting system, the magnetic field sensor array, the control module, the natural gamma probe, the motion trajectory recording module and the temperature sensor are all arranged in a tool housing.

Further, in order to facilitate placement and removal of the downhole electromagnetic logging tool, a centralizer may be provided at each end of the tool housing.

Reference numbers in the drawings:
1 upper computer;
2 data power cable;
3 downhole electromagnetic logging tool;
4 DSP processor;
5 tool housing;
6 hydraulic centralizer;
7 natural gamma probe;
8 motion trajectory recording module;
9 magnetic field sensor array;
10 temperature sensor;
11 power drive module;
12 upper transmitting coil;
13 lower transmitting coil;
14 casing;
15 tubing;
901 magnetic field sensor array shell;
902 magnetic field sensor;
903 magnetic field sensor mounting bracket;
904 non-magnetic skeleton; and
905 rotary stepping motor.

DETAILED DESCRIPTION OF THE EMBODIMENTS

Embodiment 1 of Downhole Electromagnetic Logging Tool

Figure 1:
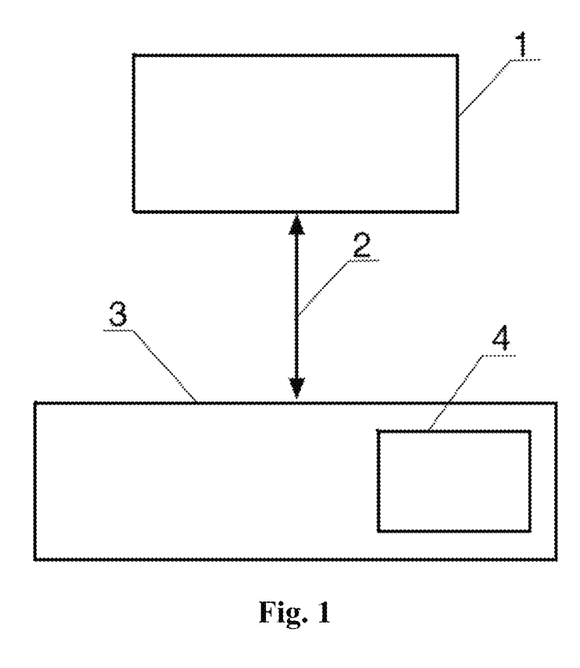
FIG. 1 is a system block diagram of a downhole electromagnetic logging tool according to the present invention.

The downhole electromagnetic logging tool is used to detect the shape of a casing. As shown in FIG. 1, in order to display the detection results, the downhole electromagnetic logging tool 3 sends data detected to an upper computer 1 disposed on the surface through a data power cable 2. The upper computer 1 displays the data in a curve, and judges whether the casing can be still used. Moreover, the upper computer 1 supplies power to the downhole electromagnetic logging tool 3, and also sends control commands thereto.

Figure 2:
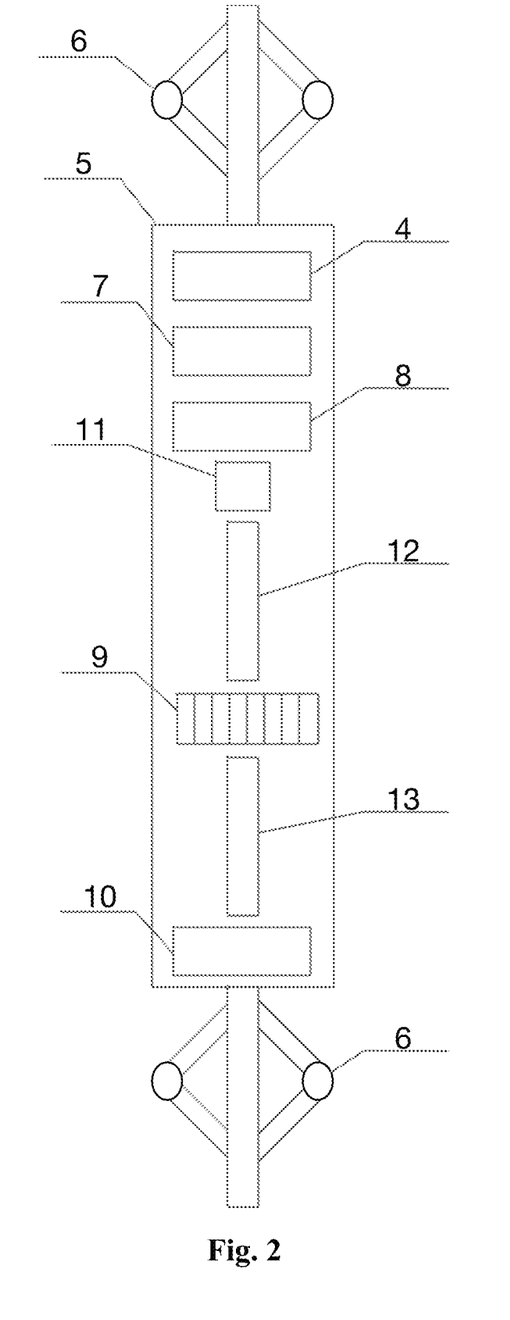
FIG. 2 schematically shows the structure of the downhole electromagnetic logging tool according to the present invention.

As shown in FIG. 2, the downhole electromagnetic logging tool at least includes a transmitting system for generating a magnetic field, a magnetic field sensor array for receiving a secondary magnetic field, and a control module. The transmitting system and the magnetic field sensor array are both connected with the control module. The transmitting system includes an upper transmitting coil and a lower transmitting coil. The upper transmitting coil and the lower transmitting coil are placed above and below the magnetic field sensor array, respectively, and generate magnetic fields with opposite polarities and opposite directions, so that the magnetic fields in different directions are concentrated at a position where the magnetic field sensor array is located based on the principle of same-polarity repulsion. Then, the magnetic field sensor array receives the secondary magnetic field to complete the detection on the casing.

In the downhole electromagnetic logging tool proposed in the embodiment according to the present invention, when the magnetic fields generated by the upper and lower transmitting coils are in opposite directions, the polarity of one end of the upper transmitting coil close to the magnetic field sensor array is the same as that of one end of the lower transmitting coil close to the magnetic field sensor array. According to the principle of same-polarity repulsion, the magnetic fields are more concentrated at the detection point, and the magnetic fields will be concentrated on the casing with larger radii after passing through the tubing, so that the magnetic field formed on the casing can be concentrated, which indicates that the strength of the magnetic field as a whole is enhanced. Therefore, when the upper transmitting coil and the lower transmitting coil are turned off, the casing will generate a larger secondary magnetic field, which carries more information on the casing to be received by the magnetic field sensor array. Since more information on the casing is carried, the shape of the casing can be featured more accurately, so that more precise detection on the casing can be achieved.

Specifically, continuing to refer to FIG. 2, the downhole electromagnetic logging tool 3 includes a DSP processor 4 (i.e., a control module), a tool housing 5, a hydraulic centralizer 6, a natural gamma probe 7, a motion trajectory recording module 8, a magnetic field sensor array 9, a temperature sensor 10, a power drive module 11, an upper transmitting coil 12, and a lower transmitting coil 13. In addition, the DSP processor 4, the natural gamma probe 7, the motion trajectory recording module 8, the power drive module 11, the upper transmitting coil 12, the magnetic field sensor array 9, the lower transmitting coil 13 and the temperature sensor 10 are arranged inside the tool housing 5 in this order. Each end of the tool housing 5 is provided with a hydraulic centralizer 6, which is used for centering the downhole electromagnetic logging tool 3 and also facilitating placement and removal of the tool. Preferably, the hydraulic centralizer 6 is a six-arm roller hydraulic centralizer.

Further, the upper transmitting coil 12 and the lower transmitting coil 13 constitute the transmitting system, and are placed above and below the magnetic field sensor array 9, respectively. The upper transmitting coil 12 and the lower transmitting coil 13 are both in communication with the DSP processor 4 through the power drive module 11, and each magnetic field sensor in the magnetic field sensor array 9 is in communication with the DSP processor 4. In addition, the natural gamma probe 7, the motion trajectory recording module 8 and the temperature sensor 10 are all in communication with the DSP processor 4.

The power drive module 11 is used to receive instructions from the DSP processor 4, and apply current to the upper transmitting coil 12 and the lower transmitting coil 13. The magnetic field sensor array 9 sends the secondary magnetic field as acquired to the DSP processor 4. In addition, the natural gamma probe 7, the motion trajectory recording module 8 and the temperature sensor 10 send respective information as acquired to the DSP processor 4. At this time, the DSP processor 4 stores the information received, and uploads it to the upper computer 1.

Figure 3:
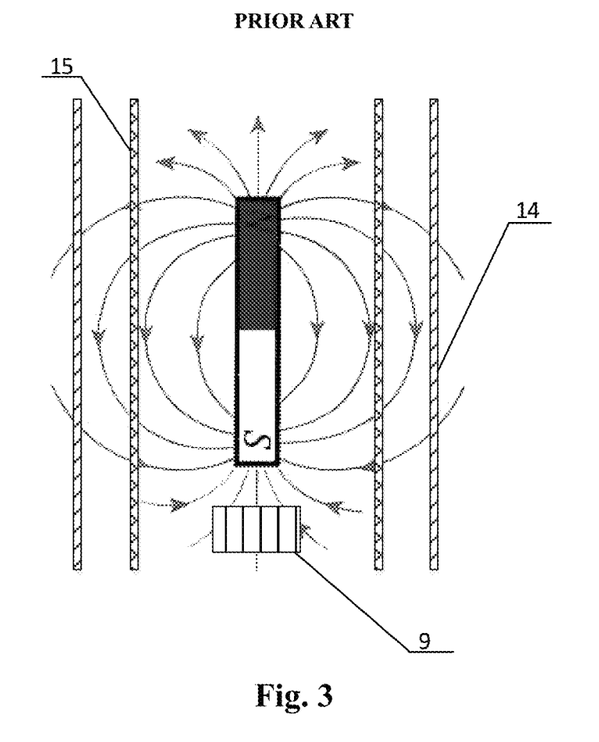
FIG. 3 shows the electromagnetic logging principle with one transmitting coil in the prior arts.

Referring to FIG. 3, according to the detection principle in the prior arts, only one transmitting coil is adopted. In this case, the magnetic field generated thereby is relatively scattered (it is known that the magnetic field lines are dense when the magnetic field strength is large, and sparse when the magnetic field strength is small), and also relatively sparse. When the magnetic field encounters the casing 14 after penetrating through the tubing 15, most of the magnetic field cannot be focused on the casing 14 after penetrating through the tubing 15, so that information of the secondary magnetic field generated by the casing 14 is seriously incomplete, causing the aging degree of the casing 14 cannot be accurately determined. Therefore, the main conception of the downhole electromagnetic logging tool 3 according to the present invention proposes to arrange the upper transmitting coil 12 and the lower transmitting coil 13 at both ends of the magnetic field sensor array 9, respectively, by which the detection on the casing 14 can be achieved.

Figure 4:
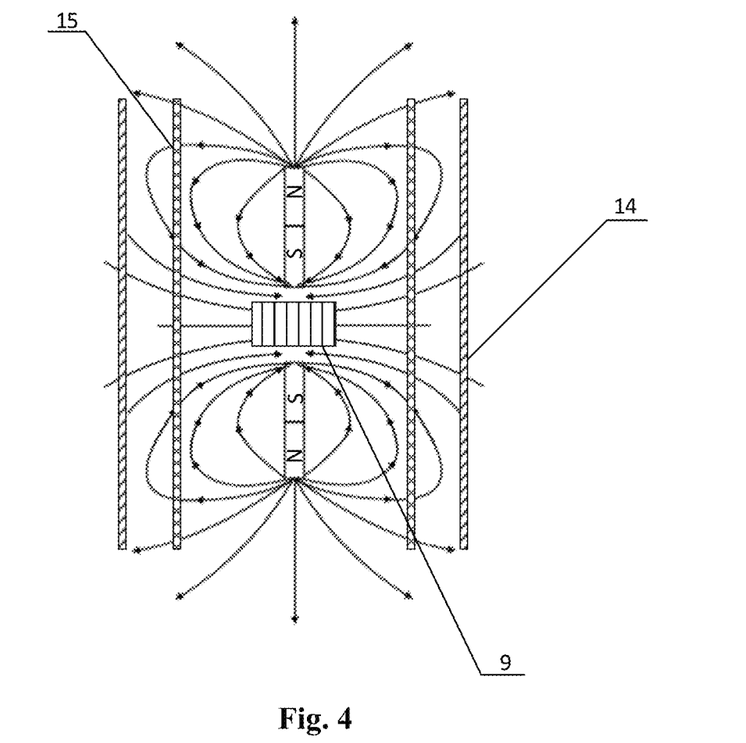
FIG. 4 shows the electromagnetic logging principle with two transmitting coils in the present invention.

As shown in FIG. 4, according to the detection principle of the present invention, the power drive module 11 applies rectangular long-period (e.g., 500-1000 ms) pulse currents with the same size but opposite directions to the upper transmitting coil 12 and the lower transmitting coil 13 simultaneously, so that the upper transmitting coil 12 and the lower transmitting coil 13 generate magnetic fields with opposite polarities and opposite directions. It can be seen from the drawing that the magnetic field lines are dense at the position where the magnetic field sensor array 9 is located. Moreover, based on the principle of same-polarity repulsion, the magnetic fields generated by the upper transmitting coil 12 and the lower transmitting coil 13 pass through the tubing 15 with respective larger radii, and are then focused on the casing 14. In this manner, the casing 14 can generate a larger secondary magnetic field, which carries more casing information.

Figure 5:
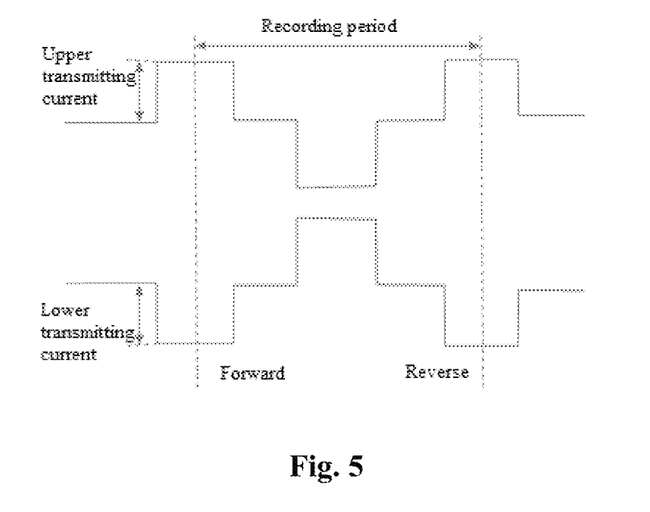
FIG. 5 shows the waveform of periodic square wave excitation signal of a transmitting system in the present invention.

In the transmitting system, the upper transmitting coil 12 and the lower transmitting coil 13 are each a magnetic cylinder wound by a low-resistance insulating cable of multi-turn closed-loop coils, mainly for transmitting a vertical magnetic field. The length of each wound coil is 0.5 m, and the effective area thereof is 100 $m^2$. The DSP processor 4 applies a periodic excitation signal having a waveform of square wave as shown in FIG. 5 to the upper transmitting coil 12 and to the lower transmitting coil 13 via the power drive module 11, wherein a recording period includes one forward attenuation and one reverse attenuation, usually 500 ms to 1000 ms, so as to compensate the magnetization effect of the tubing and the casing.

The transmitting current is set by the user through the command of the upper computer 1, wherein the forward transmitting current is the same as the reverse transmitting current, usually 40 A to 100 A. The control clock output by the DSP processor 4 controls a constant current switch of the power drive module 11, so as to control the upper transmitting coil 12 and the lower transmitting coil 13 to turn on or turn off. If the output signal of the DSP processor 4 is 0, the power drive module 11 turns off the drive current: if the output signal of the DSP processor 4 is 1, the power drive module 11 turns on the drive current forwardly; and if the output signal of the DSP processor 4 is −1, the power drive module 11 turns on the drive current reversely.

Further, the magnetic field sensor array 9 includes a magnetic field sensor array shell, 24 magnetic field sensors, a magnetic field sensor mounting bracket, and a non-magnetic skeleton. The magnetic field sensor array shell is a cylindrical one, and the non-magnetic skeleton is coaxially arranged in the cylindrical shell. In order to fix the magnetic field sensors, in the embodiment of the present invention, the non-magnetic skeleton is provided thereon with the magnetic field sensor mounting bracket for fixing the magnetic field sensors. The magnetic field sensor mounting bracket is formed thereon with 24 grooves, each corresponding to a respective one of the magnetic field sensors in shape, so that the magnetic field sensors can be more firmly fixed in the corresponding grooves.

Further, each magnetic field sensor is connected to the DSP processor 4, and responsible for receiving a magnetic field of a corresponding angle. The DSP processor 4 sends a synchronous acquisition instruction to each magnetic field sensor, in order to realize acquisition of the secondary magnetic field. In the case of 24 magnetic field sensors, since 360°/24=15°, the magnetic field sensor array 9 has a resolution of 15°.

The temperature sensor 10 acquires the temperature of the fluid in the wellbore, which can be used to assist in judging damage of the casing and leakage of the fluid. The natural gamma probe 7 is used to correct the depth of the downhole electromagnetic logging tool 3. The motion trajectory recording module 8 is used to record the motion trajectory of the downhole electromagnetic logging tool 3.

Figure 6:
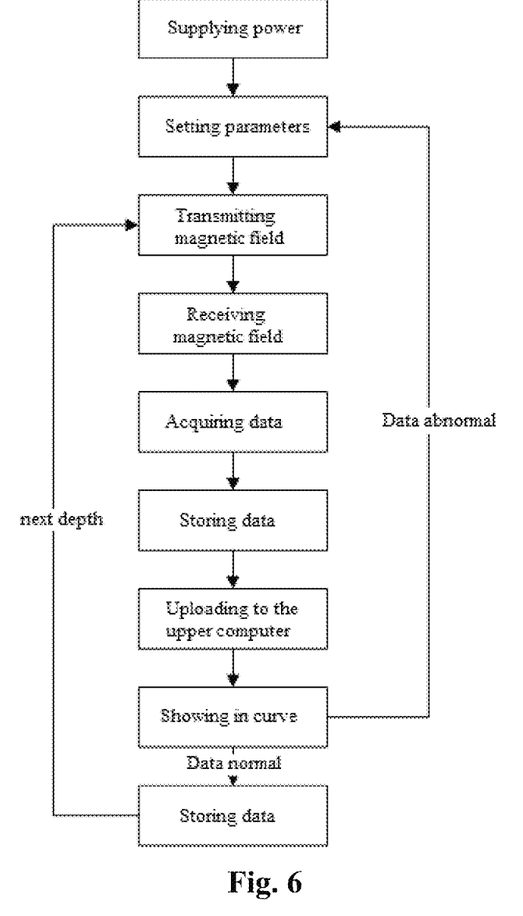
FIG. 6 is a flow chart of detection of the downhole electromagnetic logging tool according to the present invention.

As shown in FIG. 6, the operation procedure of the downhole electromagnetic logging tool 3 is as follows.

1) The upper computer 1 supplies power to the downhole electromagnetic logging tool 3, and sets the parameters thereof.

2) After the downhole electromagnetic logging tool 3 is lowered to the measurement point of a certain depth, the DSP processor 4 receives a command from the upper computer 1 to start transmitting the electromagnetic field. Specifically, the DSP processor 4 sends periodic excitation signals of square wave, as shown in FIG. 5, to the upper transmitting coil 12 and the lower transmitting coil 13 via the power drive module 11, thus controlling the upper transmitting coil 12 and the lower transmitting coil 13 to turn on or turn off.

When the upper transmitting coil 12 and the lower transmitting coil 13 are turned on, currents of equal magnitude but opposite directions flow therethrough, generating magnetic fields with opposite polarities. The magnetic fields are focused on the casing 14 after passing through the tubing 15. When the upper transmitting coil 12 and the lower transmitting coil 13 are turned off, the casing 14 generates the secondary magnetic field, and the DSP processor 4 sends a common clock signal to control each sensor in the magnetic field sensor array 9 for acquiring electrical signals synchronously. The magnetic field sensor array 9 acts as a receiver to receive an induced electromotive force generated by the secondary magnetic field induced by an eddy current electric field in each sector of the casing wall, and the DSP processor 4 processes and stores the information acquired by the magnetic field sensor array 9.

When the DSP processor 4 starts to record the information acquired by the magnetic field sensor array 9, the DSP processor 4 also records the information acquired by the motion trajectory recording module 8, the information acquired by the natural gamma probe 7, the signal acquired by the temperature sensor 10, and the transmitting current information sent by the power drive module 11.

In addition to control the operation sequence, the DSP processor 4 further acquires the natural gamma signal, the motion trajectory signal and the temperature signal, and controls the power transmission, while controlling the sensors 902 to perform synchronous acquisition.

3) The downhole electromagnetic logging tool 3 stores a current data packet in the DSP processor 4, and waits for an upload command from the upper computer 1.

4) After the DSP processor 4 receives the upload command, it sends the data packet as stored to the upper computer 1.

5) The upper computer 1 analyzes the uploaded data packets as received, and displays the data in form of a curve.

6) The upper computer 1 automatically determines whether the data is abnormal or normal according to preset determination conditions. If the data is abnormal, the upper computer prompts the user to modify the settings and then conduct measurement again; and if the data is normal, the data packet is stored.

7) After the data packet is stored, measurement is carried out for the measurement point at a next depth.

In the above embodiment, the DSP processor 4 controls magnetic field sensors in the magnetic field sensor array 9 to receive the secondary magnetic field synchronously, so as to complete the detection. As another implementing mode, the DSP processor 4 can also control the magnetic field sensors in the magnetic field sensor array 9 to receive the secondary magnetic field in a predetermined time sequence. In the present invention, how the magnetic field sensor array 9 receives the secondary magnetic field is not restricted.

In the above embodiment, in order to control the upper transmitting coil 12 and the lower transmitting coil 13 conveniently, the DSP processor 4 drives and controls the upper transmitting coil 12 and the lower transmitting coil 13 via the power driving module 11. As another implementing mode, the controller 4 can also control the upper transmitting coil 12 and the lower transmitting coil 13 directly.

In the above embodiment, in order to assist the operation of the downhole electromagnetic logging tool 3, the downhole electromagnetic logging tool 3 further includes the motion trajectory recording module 8, the natural gamma probe 7, and the temperature sensor 10. However, the key point of the present invention lies in arrangement of two transmitting coils, so that the motion trajectory recording module 8, the natural gamma probe 7 and the temperature sensor 10 may be omitted as long as the basic detection can be realized.

In the above embodiment, the hydraulic centralizer 6 functions to facilitate the arrangement and removal of the downhole electromagnetic logging tool 3 and the position adjustment thereof. As another implementing mode, the hydraulic centralizer 6 may be omitted if it is unnecessary to take the position of downhole electromagnetic logging tool 3 into consideration.

According to the present invention, with two transmitting coils arranged above and below the magnetic field sensor array 9, respectively, the magnetic fields generated by the transmitting system can be focused on the casing 14 with larger radii. Accordingly, the secondary magnetic field generated by the casing 14 is denser and thus carries more casing information, which improves the accuracy of detection.

Embodiment 2 of Downhole Electromagnetic Logging Tool

The downhole electromagnetic logging tool proposed in Embodiment 2 differs from that proposed in Embodiment 1 in that the magnetic field sensor array 9 is a rotatable magnetic field sensor array 9. Therefore, through rotation of the magnetic field sensor array 9, the resolution of the magnetic field sensor array 9 can be improved, thus minimizing blind areas of detection caused by the angle between two adjacent sensors, and realizing a 360° reception of the magnetic field signal.

Figure 7:
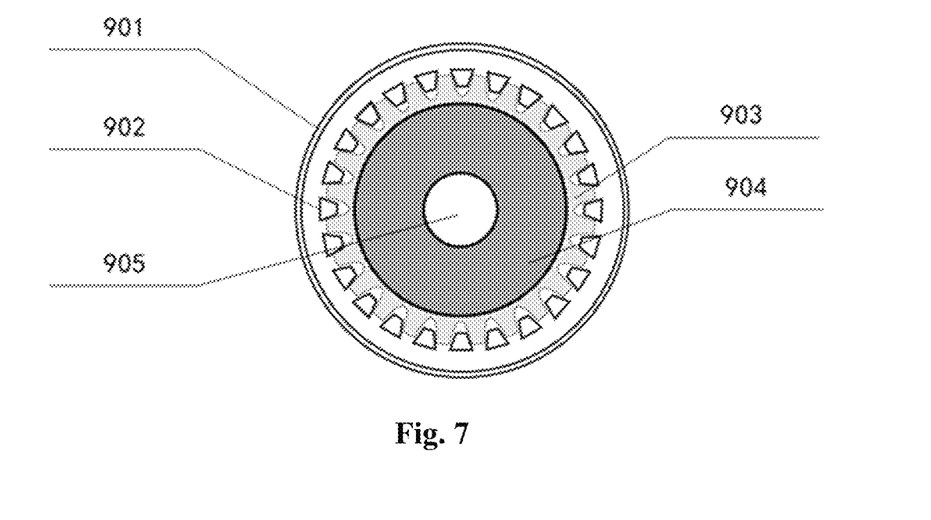
FIG. 7 schematically shows the structure of a rotatable magnetic field sensor array according to the present invention.

Specifically, as shown in FIG. 7, the rotatable magnetic field sensor array 9 includes a magnetic field sensor array shell 901, 24 magnetic field sensors 902, a magnetic field sensor mounting bracket 903, a non-magnetic skeleton 904, and a rotary stepping motor 905. The magnetic field sensor array shell 901 is a cylindrical one, along the axis of which the rotary stepping motor 905 is installed. The axis of the cylindrical shell is parallel to that of the tool housing 5, and the non-magnetic skeleton 904 is mounted on a rotating shaft of the rotary stepping motor 905. The non-magnetic skeleton 904 is provided thereon with the magnetic field sensor mounting bracket 903 for fixing the magnetic field sensors 902. The magnetic field sensor mounting bracket 903 is formed with 24 grooves, each corresponding to a respective one of the magnetic field sensors 902 in shape, so that each magnetic field sensor 902 can be more firmly fixed in a corresponding groove.

Further, each magnetic field sensor 902 and the rotary stepping motor 905 are connected to the DSP processor 4, and each magnetic field sensor 902 is responsible for receiving the magnetic field of a corresponding angle. The DSP processor 4 sends a synchronous acquisition command to each magnetic field sensor 902, and in the meantime, sends a rotation command to the rotary stepping motor 905. The rotary stepping motor 905 can drive said 24 magnetic field sensors 902 to rotate around the axial direction. Since the magnetic field sensor array 9 receives the magnetic field information in a rotating manner, the blind areas of detection can be reduced.

For example: since a circle is 360° and 360°/24=15° for 24 magnetic field sensors 902, the magnetic field sensor array 9 has a resolution of 15°. Accordingly, there is a blind area of acquisition of 15°. The rotary stepper motor 905 can, under the control sequence of the DSP processor 4, rotate with an angle of 1° at the minimum. Therefore, the magnetic field sensor array 9 has an angular resolution of 1°. In this manner, a fine detection of 1° along the circumferential direction can be realized after 15 times of rotation, so that the blind area of detection caused by the angle between two adjacent sensors can be avoided, thus realizing a 360° reception along the circumferential direction for the magnetic field signal transmitted.

In the above the specific structure of the magnetic field sensor array 9 is described in detail. However, in the embodiments of the present invention the specific structure of the magnetic field sensor array 9 would not be restricted, as long as the magnetic field sensors can form a set array to receive the magnetic field.

Other structures and connections of the downhole electromagnetic logging tool 3 in Embodiment 2 are the same as those of the downhole electromagnetic logging tool 3 in Embodiment 1, and thus will not be repeated here since they have been introduced Embodiment 1.

Therefore, the operation procedure of the downhole electromagnetic logging tool 3 in Embodiment 2 is as follows.

1) The upper computer 1 supplies power to the downhole electromagnetic logging tool 3, and sets the parameters thereof.

2) After the downhole electromagnetic logging tool 3 is lowered to the measurement point of a certain depth, the DSP processor 4 receives a command from the upper computer 1 to start transmitting the electromagnetic field. Specifically, the DSP processor 4 sends periodic excitation signals of square wave, as shown in FIG. 5, to the upper transmitting coil 12 and the lower transmitting coil 13 via the power drive module 11, thus controlling the upper transmitting coil 12 and the lower transmitting coil 13 to turn on or turn off.

When the upper transmitting coil 12 and the lower transmitting coil 13 are turned on, currents of equal magnitude but opposite directions flow therethrough, generating magnetic fields with opposite polarities. The magnetic fields are focused on the casing 14 after passing through the tubing 15. When the upper transmitting coil 12 and the lower transmitting coil 13 are turned off, the casing 14 generates the secondary magnetic field, and the DSP processor 4 sends a common clock signal to control each sensor 902 in the magnetic field sensor array 9 for acquiring electrical signals synchronously, and control the rotation signals of the magnetic field sensor array 9 to turn on the magnetic field sensor array 9. The magnetic field sensor array 9 acts as a receiver to receive an induced electromotive force generated by the secondary magnetic field induced by an eddy current electric field in each sector of the casing wall, and the DSP processor 4 processes and stores the information acquired by the magnetic field sensor array 9.

When the DSP processor 4 starts to record the information acquired by the magnetic field sensor array 9, the DSP processor 4 also records the information acquired by the motion trajectory recording module 8, the information acquired by the natural gamma probe 7, the signal acquired by the temperature sensor 10, and the transmitting current information sent by the power drive module 11.

In addition to control the operation sequence, the DSP processor 4 also acquires the natural gamma signal, the motion trajectory signal and the temperature signal, and controls the power emission, while controlling the sensors 902 to perform synchronous acquisition.

3) The downhole electromagnetic logging tool 3 stores the current data packet in the DSP processor 4, and waits for an upload command from the upper computer 1.

4) After the DSP processor 4 receives the upload command, it sends the data packet stored to the upper computer 1.

5) The upper computer 1 analyzes the uploaded data packets as received, and displays the data in form of a curve.

6) The upper computer 1 automatically determines whether the data is abnormal or normal according to preset determination conditions. If the data is abnormal, the upper computer prompts the user to modify the settings and then measure again; and if the data is normal, the data packet is stored.

7) After the data packet is stored, measurement is carried out for the measurement point at a next depth.

Embodiment 3 of Downhole Electromagnetic Logging Tool

The downhole electromagnetic logging tool proposed in Embodiment 3 differs from that proposed in Embodiment 1 as follows. The two coils of the transmitting system in Embodiment 1 are wound in the same way, so that the magnetic fields generated by currents flowing through the two coils with identical magnitude but opposite directions will have opposite polarities. However, in Embodiment 3, the two coils of the transmitting system are wound in opposite ways, so that the magnetic fields generated by currents flowing through the two coils with identical magnitude and identical direction will have opposite polarities also. That is, the ends of the two coils close to the magnetic field sensor array 9 have the same polarity.

Other structures, connections and the operation procedure of the downhole electromagnetic logging tool of Embodiment 3 are the same as those of the downhole electromagnetic logging tool in Embodiment 1, and will not be repeated here.

The invention claimed is:

1. A downhole electromagnetic logging tool, comprising a transmitting system for generating a magnetic field, a magnetic field sensor array for receiving a secondary magnetic field, and a control module connected with the transmitting system and the magnetic field sensor array,
    wherein the transmitting system includes an upper transmitting coil and a lower transmitting coil arranged above and below the magnetic field sensor array, respectively, for generating magnetic fields with opposite polarities and opposite directions, so that the magnetic fields with different directions generated by the upper and lower transmitting coils are concentrated, according to the principle of same-polarity repulsion, at a position where the magnetic field sensor array is located, the magnetic field sensor array receiving the secondary magnetic field for completion of detection on a casing, and
    wherein the magnetic field sensor array is a rotatable magnetic field sensor array, and the downhole electromagnetic logging tool further comprises a driving device for driving the magnetic field sensor array in rotation, the driving device being connected to the control module, which controls rotation of the rotatable magnetic field sensor array through the driving device to reduce blind area for detection.

2. The downhole electromagnetic logging tool according to claim 1, wherein the upper transmitting coil and the lower transmitting coil are wound in a same way, so that magnetic fields with opposite polarities are generated by currents of a same magnitude but opposite directions flowing in the coils.

3. The downhole electromagnetic logging tool according to claim 1, wherein the upper transmitting coil and the lower transmitting coil each comprise a magnetic cylinder wound by a low-resistance insulating cable of multi-turn closed-loop coils.

4. The downhole electromagnetic logging tool according to claim 1, further comprising a power drive module, wherein the control module is connected with the upper transmitting coil and the lower transmitting coil via the power driving module.

5. The downhole electromagnetic logging tool according to claim 1, wherein the driving device is a rotary stepping motor, through which the control module controls rotation of the rotatable magnetic field sensor array.

6. The downhole electromagnetic logging tool according to claim 1, wherein the magnetic field sensor array comprises a magnetic field sensor array shell, at least two magnetic field sensors, a mounting bracket for fixing the sensors, and a non-magnetic skeleton for fixing the mounting bracket.

7. The downhole electromagnetic logging tool according to claim 1, wherein the magnetic field sensor array comprises a magnetic field sensor array shell, at least two magnetic field sensors, a mounting bracket for fixing the sensors, and a non-magnetic skeleton for fixing the mounting bracket, the non-magnetic skeleton being installed on a rotating shaft of the driving device.

8. The downhole electromagnetic logging tool according to claim 1, wherein the downhole electromagnetic logging tool further comprises a natural gamma probe, a motion trajectory recording module and a temperature sensor, and
    the natural gamma probe, the motion trajectory recording module and the temperature sensor are all connected to the control module, and the transmitting system, the magnetic field sensor array, the control module, the natural gamma probe, the motion trajectory recording module and the temperature sensor are all arranged in a tool housing.

9. The downhole electromagnetic logging tool according to claim 8, wherein a centralizer is provided at each end of the tool housing.

* * * * *